United States Patent [19]

Launius

[11] 3,858,106

[45] Dec. 31, 1974

[54] CONTROL CIRCUIT UTILIZING TEMPERATURE ACTUATED SWITCHES AND SILICON CONTROLLED RECTIFIERS FOR REVERSING THE POLARITY OF DIRECT CURRENT APPLIED TO A LOAD

[76] Inventor: Clifford G. Launius, 1783 Stockton Ave., Des Plaines, Ill. 60018

[22] Filed: Oct. 25, 1973

[21] Appl. No.: 409,373

[52] U.S. Cl. ........................ 321/45 R, 62/3, 165/27, 165/48, 307/117, 307/310

[51] Int. Cl. ........................ F25b 21/02

[58] Field of Search .............. 62/3; 165/27, 48, 159; 321/45 R, 8, 16; 307/138, 127, 310, 116, 117, 252 J; 318/283–285, 293, 294

[56] References Cited

UNITED STATES PATENTS

| | | | |
|---|---|---|---|
| 2,872,582 | 2/1959 | Norton | 321/45 R |
| 3,077,079 | 2/1963 | Pietsch | 62/3 |
| 3,107,324 | 10/1963 | Wright et al. | 62/3 X |
| 3,246,210 | 4/1966 | Lorenz | 307/310 X |
| 3,252,013 | 5/1966 | Stanton | 62/3 X |
| 3,254,494 | 6/1966 | Chartouni | 62/3 |
| 3,308,800 | 3/1967 | Motto, Jr. et al. | 307/252 J X |
| 3,458,727 | 7/1969 | Watkins, Jr. | 307/127 X |
| 3,600,900 | 8/1971 | Buddecke | 62/3 |
| 3,602,789 | 8/1971 | Leistner | 318/305 X |
| 3,713,302 | 1/1973 | Reviel | 62/3 |

*Primary Examiner*—R. N. Envall, Jr.
*Attorney, Agent, or Firm*—Kinzer, Plyer, Dorn & McEachran

[57] ABSTRACT

A control circuit for reversing the polarity of direct current applied to a load. The circuit utilizes temperature actuated switches and silicon controlled rectifiers located in a bridge connected between positive and negative direct current input terminals. In one embodiment of the invention, the load is a thermoelectric element connected between two heat conductive members, one of which is located inside an insulated container and the other of which is located on the exterior of the same container. In the preferred embodiment of the invention, the container is intended to be used for storing medicines which must be maintained between fixed temperature limits.

9 Claims, 3 Drawing Figures

CONTROL CIRCUIT UTILIZING TEMPERATURE ACTUATED SWITCHES AND SILICON CONTROLLED RECTIFIERS FOR REVERSING THE POLARITY OF DIRECT CURRENT APPLIED TO A LOAD

SUMMARY OF THE INVENTION

This invention is directed to a control circuit for reversing the polarity of direct current applied to a load. This circuit is particularly useful when the load is a thermoelectric element useful for producing cooling and heating in accordance with the Peltier effect.

Accordingly, an object of this invention is to utilize such a circuit to reverse the polarity of direct current applied to a thermoelectric element to thereby conveniently utilize the thermoelectric element for both cooling and heating.

Another object is a control circuit for a thermoelectric element which will control the heating and cooling effects of the element to maintain a temperature within predetermined limits.

Another object is a control circuit for use in a portable device for maintaining the temperature of a medicine within predetermined limits.

Another object is a temperature control circuit for a portable storage container which circuit provides completely automatic operation and functions without manually controlled "on-off" switches, thereby eliminating the risk that the circuit may be inadvertently shut off.

Another object is a temperature control circuit for a portable container which permits orientation of the container in almost any attitude without interfering with the operation of the circuit.

Another object is a control circuit for a thermoelectric element which will fail safe when either of its temperature actuated switches short-circuits.

Another object is a control circuit for a thermoelectric element which operates the thermoelectric element only when upper or lower temperatures are reached, thereby conserving electrical energy.

Other objects may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figures 1, 2, 3:
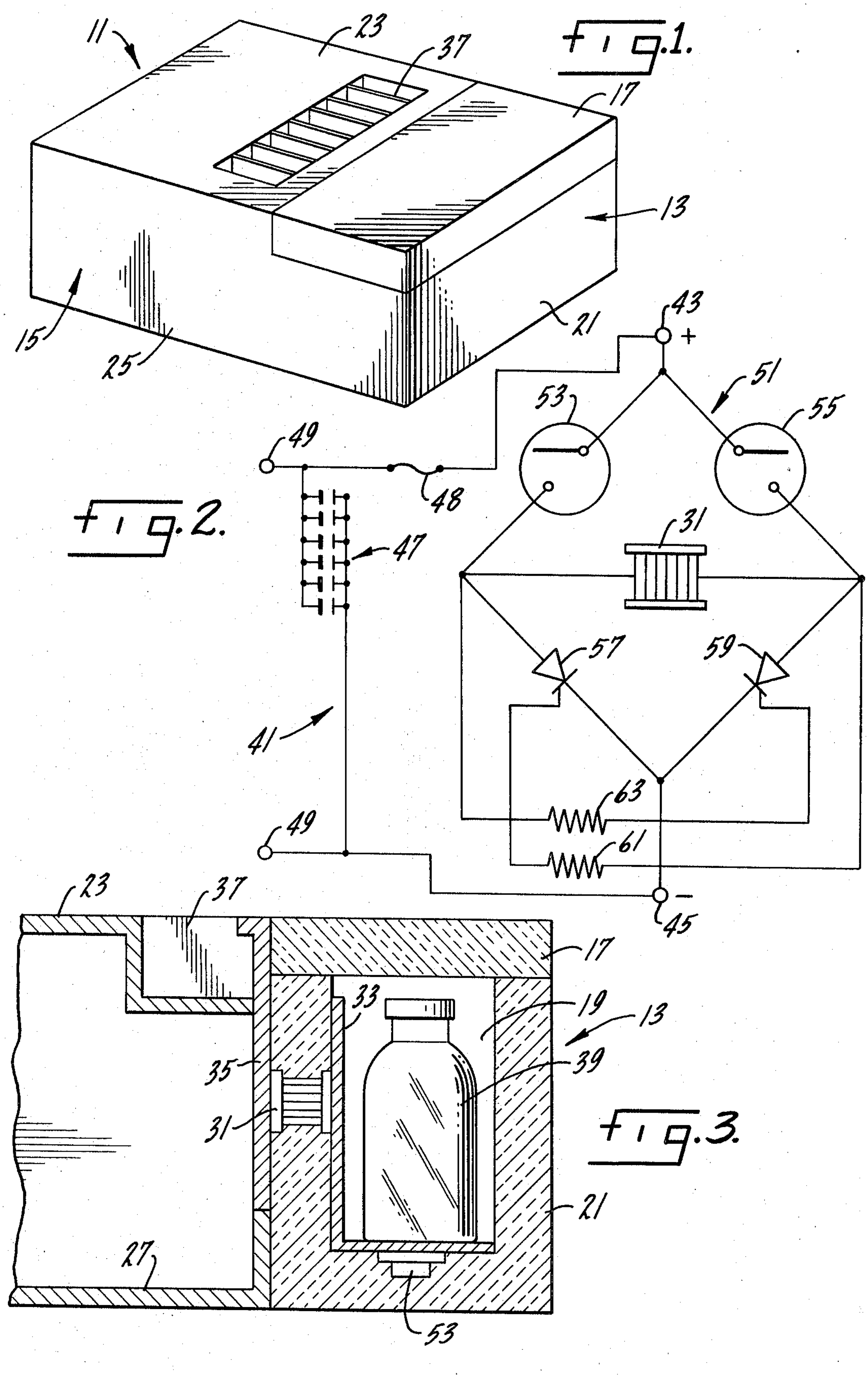
FIG. 1 is a perspective view of an insulated temperature controlled container utilizing the control circuit of this invention.
FIG. 2 is a schematic drawing of a control circuit of this invention.
FIG. 3 is a partial cross sectional view of the storage container of FIG. 1.

A container 11 which may utilize the control circuit of this invention is shown in FIGS. 1 and 3 of the drawings. The container is made in two sections, namely, an insulated storage section 13 and a non-insulated utility section 15. The insulated storage section 13 is equipped with a removable, insulated cover 17 which fits over a storage well 19. The cover 17 and walls 21 of the insulated section are relatively thick and may be formed of any suitable insulating material, polystyrene and polyurethane being examples.

The walls of the non-insulated utility section 15 may be of any suitable, relatively strong, light weight material, however, for purposes of efficient heat transfer, in this embodiment of the invention, the upper wall 23 and side walls 25 are formed of a heat conductive material such as aluminum. The bottom wall 27 and end wall (not shown) of the utility section 15 may be formed of any suitable, strong material, wood and plastic being examples. The walls of the utility section must be strong enough to support the weight of a power supply. Dry cell batteries may conveniently be used to provide the energy for heating and cooling the insulated section. Additionally, it may be desirable to provide room to permit the installation of a transformer, rectifier and filter, for converting alternating current into direct current, both for charging the dry cell batteries and to permit the container to be connected to a source of alternating current. Because these items are of conventional construction and for simplicity of illustration, the transformer, rectifier and accessory equipment are not shown in the drawings.

A thermoelectric element 31 is mounted in a wall 21 of the insulated storage section 13 and extends between an internal heat sink 33 positioned in the storage well 19 and an external heat sink 35 forming a wall of the utility container 15. The heat sink includes fins 37 to assist in dissipating the heat removed from the internal heat sink 33. The metal walls 23 and 25 of the utility compartment 15 are connected to the heat sink 35 and the fins 37 to provide additional capacity for removal of heat from the internal heat sink 33.

The storage well 19 is sized to receive one or more vials 39 of medicine, for example, insulin, supported on the interior heat sink 33 which, in this embodiment, is L-shaped in cross section. The well 19 may be dimensioned so that it will hold the vials 39 securely against movement no matter what the attitude or orientation of the container.

The control circuit 41 of this invention is shown schematically in FIG. 2 of the drawings. It includes terminals 43 and 45 connected to a source of direct current which in this case are dry cell batteries 47 connected in parallel. A fuse 48 is provided between the batteries and terminal 43. Also connected in parallel with the batteries 47 are contacts 49 adapted to be connected to a source of smooth, direct current which may be obtained through a transformer, rectifier and filter from a source of alternating current such as ordinary house current. Since a suitable transformer, rectifier and filter may be of conventional construction, may be installed in the utility compartment 15, or may be included as a unit separate and apart from the container 11, they are not shown in the drawings.

In the circuit shown, the terminal 43 is positive and the terminal 45 is negative. Six dry cell batteries are shown comprising the source of power. These may be of the D type of 1½ volts each. It should be understood that, depending on the particular power requirements, other arrangements and number of batteries may be used.

Connecting the input terminals 43 and 45 is a bridge 51. Located in the legs of the bridge which are connected to the positive input terminal 43 are temperature actuated switches 53 and 55. Located in the legs of the bridge connected to the negative input terminal 45 are silicon controlled rectifiers 57 and 59. Connected across the output terminals of the bridge is the thermoelectric element 31.

The temperature actuated switches 53 and 55 are mounted on the base of the heat sink 33 which is located inside the insulated compartment 13. These switches are of the on/off type and are calibrated to operate at different temperature ranges. Switch 53 is set to close at temperatures of 55°F and higher and to open at temperatures 50°F and below. Switch 55 closes at temperatures of 40°F and below and opens at temperatures of 45°F and above.

The silicon controlled rectifiers 57 and 59 are gated (turned on) by action of the temperature actuated switches. The rectifiers are turned on only by positive signals applied to their gates. To limit the currents to the proper values at the gates, resistors 61 and 63 are provided respectively for the rectifiers 57 and 59. Temperature actuated switch 53 controls rectifier 59 located in the leg of the bridge opposit to said switch and temperature actuated switch 55 controls rectifier 57 located in the leg of the bridge opposite thereto.

The Use, Operation and Function of This Invention are as follows

Whereas, the control circuit of this invention is capable of adaption to many uses where it is desired to reverse the polarity of direct current applied to a load, for purposes of illustration this circuit will be shown and described as applied to a portable device for maintaining medicine within desired temperature limits. For illustrative purposes, insulin will be referred to as typical of the types of medicine that must be maintained for long periods of time between set temperature limits. Many times, this medicine must be used away from home and therefore, it is subjected to wide ranges of ambient temperatures. The portable container 11 of this invention permits the transportation of insulin under various temperature comditions, while maintaining the insulin between the desired temperature ranges. The insulin in its vial 39 is stored in the well 19 of the insulated storage portion 13 of the container. The vial rests on an internal heat sink 33 which is connected through a thermoelectric element 31 to an external heat sink 35, fins 37 and heat dissipating surfaces 23 and 25 of the container 11. The thermoelectric element 31 is located in control circuit 51 which is designed to operate the element 31 so as to maintain the temperature of the insulin between a minimum of 40°F. and a maximum of 55°F.

Assume for the purposes of illustration that the temperature of the insulin in the vial 39 is between 45° and 55°F. At this temperature, both switches 53 and 55 will be open. Silicon controlled rectifiers 57 and 59 will be in their non-conductive conditions. Since the container 13 has thick, insulated walls 21, the temperature of the vial will remain in this temperature range for a long period of time, even though the temperature of the atmosphere surrounding the container may be considerably above or below this temperature range, or may even fluctuate above and below this range.

When the temperature of the insulin increases to 55°F., as would occur when the container is exposed to higher temperatures for a long period of time, temperature actuated switch 53 will close, applying a positive voltage to the left side of thermoelectric element 31 as viewed in FIG. 2 and will gate or turn on silicon controlled rectifier 59. The actuation of rectifier 59 will apply a negative voltage from the terminal 45 to the right side of the thermoelectric element 31 as viewed in FIG. 2. The application of voltages, positive on the left side of element 31 and negative on the right as viewed in FIG. 2 will cause theremoelectric element 31 to cool the heat sink 33.

The cooling action of element 31 applied to the heat sink 33 will continue until the temperature of this heat sink declines to 50°F. at which temperature switch 53 opens. The opening of switch 53 interrupts the positive voltage from terminal 43 to element 31 and opens rectifier 59, thus interrupting the negative voltage from terminal 45 to element 31. With the ambient temperature surrounding the container remaining constant, the control circuit will cycle between 50° and 55°F.

In situations where the container 11 is subjected to temperatures below freezing, the control circuit of this invention functions to prevent the insulin from freezing. When the temperature of heat sink 33 drops to 40°F., switch 55 closes. A positive voltage from terminal 43 is applied to the right side of thermoelectric element 31 as viewed in FIG. 2. Rectifier 57 is gated thereby applying a negative voltage to the left side of element 31. This application of voltages causes the element 31 to heat the internal heat sink 33.

When the temperature of heat sink 33 reaches 45°F., switch 55 opens. This interrupts the positive and negative voltages to the element 31. If the ambient temperature around the container 11 remains constant, the control circuit will cycle between 40° and 45°F.

The control curcuit of this invention will fail safe in the event either of the temperature-actuated switches 53 or 55 fails in a circuit completing position. For example, if switch 53 short-circuited so that the element 31 continues to cool even after the temperature of the heat sink 33 drops below the temperature at which this switch is to open, the cooling will continue only until the operating temperature of switch 55 is reached. When switch 55 closes, the control circuit will be short-circuited between the terminals 43 and 45. Fusing 48 will interrupt the power supply leaving the insulin at its lowest desirable temperature, thereby providing the maximum time period of safe storage for the fault to be detected.

Whereas, the preferred form of the invention has been described and shown, it should be understood that there are modifications, alterations and changes which may be made without departing from the teachings of the invention. Therefore, the scope of the invention should be limited only by the claims attached thereto.

I claim:

1. A control circuit for maintaining the temperature of a substance, such as medicine, between specific limits by reversing the polarity of direct electrical current applied to a thermoelectric element, said circuit including:

positive and negative input terminals, a bridge connecting said input terminals, a thermoelectric element connected across the bridge output terminals, a temperature actuated switch located in each leg of the bridge connected to the positive input terminal, said temperature actuated switches being normally open and one of said switches operating at a higher temperature range than the other of said switches with said temperature actuated switch operating in the higher range closing at an upper temperature limit and opening at a slightly lower temperature limit and said temperature actuated switch operating in the lower temperature range closing at a lower temperature limit and opening at a slightly higher temperature limit, a semiconductor device located in each leg of the bridge connected to the negative input terminal, and means to gate the semiconductor device in the opposite leg of the bridge when either temperature actuated switch is closed.

2. The control circuit of claim 1 in which said temperature actuated switch operating in the higher temperature range closes at an upper temperature of approximately 55° F. and opens at a lower temperature of approximately 50° F. and said temperature actuated switch operating in the lower temperature range closes at a lower temperature of approximately 40° F. and opens at an upper temperature of approximately 45° F.

3. The control circuit of claim 1 in which said thermoelectric element is connected between two heat conductive elements, one of which is located inside an insulated container and the other of which is located on the exterior of the same insulated container.

4. The control circuit of claim 3 in which said temperature actuated switches are mounted on said heat conductive element located inside said insulated container.

5. The control circuit of claim 4 in which said heat conductive element located inside said insulated container is formed and adapted to support materials to be heated or cooled.

6. An insulated container for storing medicines and the like including an insulated storage compartment adapted to receive and hold containers of medicine, a heat conductive element positioned in said storage compartment and located in heat transfer relationship to said containers of medicine, a second heat conductive element located on the exterior of said insulated container, a thermoelectric element connected between said heat conductive elements, a source of direct current connected to positive and negative input terminals, a bridge connecting said input terminals with said thermoelectric element being located across said bridge output terminals, a temperature actuated switch located in each leg of the bridge connected to the positive input terminal, a silicon controlled rectifier located in each leg of the bridge connected to the negative output terminal, and means to gate the silicon controlled rectifier in the opposite leg of the bridge when a temperature actuated switch is closed.

7. The container of claim 6 in which said temperature actuated switches are normally open and said silicon controlled rectifiers are normally non-conductive.

8. The insulated container of claim 6 in which one of said temperature actuated switches operates at a higher temperature range than the other of said switches.

9. The insulated container of claim 8 in which said temperature actuated switch operating in the upper range closes at an upper temperature limit and opens at a slightly lower temperature limit and said temperature actuated switch operating in the lower temperature range closes at a lower temperature limit and opens at a slightly higher temperature limit.

* * * * *